(12) United States Patent
Delshadpour et al.

(10) Patent No.: US 10,742,116 B2
(45) Date of Patent: Aug. 11, 2020

(54) HIGH VOLTAGE REGULATOR USING LOW VOLTAGE DEVICES

(71) Applicant: NXP USA, Inc., Austin, TX (US)

(72) Inventors: Siamak Delshadpour, Phoenix, AZ (US); Gaurav Sharma, Corvallis, OR (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/203,751

(22) Filed: Nov. 29, 2018

(65) Prior Publication Data

US 2020/0177076 A1    Jun. 4, 2020

(51) Int. Cl.
*H02M 3/07* (2006.01)
*H02M 1/088* (2006.01)
*H02M 1/00* (2006.01)

(52) U.S. Cl.
CPC .............. *H02M 3/07* (2013.01); *H02M 1/088* (2013.01); *H02M 2001/0045* (2013.01); *H02M 2003/072* (2013.01)

(58) Field of Classification Search
CPC .. G05F 3/00; G05F 3/205; G11C 5/00; G11C 5/145; H02M 1/00; H02M 1/088; H02M 2001/00; H02M 2001/0045; H02M 2003/00; H02M 2003/072; H02M 2003/077; H02M 3/00; H02M 3/07; H02M 3/073

USPC ........................................................ 327/536
See application file for complete search history.

(56) References Cited

U.S. PATENT DOCUMENTS

| 7,199,567 | B2 | 4/2007 | Eberlein | |
| 7,477,046 | B2 | 1/2009 | Eberlein | |
| 7,482,790 | B2 | 1/2009 | Eberlein | |
| 10,236,872 | B1* | 3/2019 | Willard | H03K 17/6874 |
| 2006/0119335 | A1* | 6/2006 | Eberlein | G05F 1/575 323/282 |
| 2015/0340946 | A1* | 11/2015 | Toshiyuki | H02M 3/07 327/157 |

* cited by examiner

*Primary Examiner* — Lincoln D Donovan
*Assistant Examiner* — Dave Mattison (57) ABSTRACT

Embodiments are provided for voltage regulators that include a first, a second, a third, and a fourth NMOS transistor cascoded between a high voltage source and a low voltage output; a resistor network including a first, a second, a third, and a fourth resistor connected in series between the high voltage source and ground, wherein gate electrodes of the second, third, and fourth NMOS are respectively connected to nodes between the first and second resistors, the second and third resistors, and the third and fourth resistors; and a multi-stage charge pump configured to provide a first bias voltage to a gate electrode of the first NMOS and a second bias voltage to the gate electrode of the second NMOS.

26 Claims, 9 Drawing Sheets

HIGH VOLTAGE REGULATOR USING LOW VOLTAGE DEVICES

BACKGROUND

Field

This disclosure relates generally to voltage regulators, and more specifically, to a high voltage regulator implemented with low voltage devices.

Related Art

Various communication protocol standards support data exchanges or transfers between devices, such as a host device and one or more peripheral devices. For example, the USB (Universal Serial Bus) standard defines different types of ports that are used by a peripheral device not only for data transfer, but also for charging. A host device typically has charging capability, which may be provided to a peripheral device through a USB type-C connection that includes a "Vbus" pin. While Vbus provides a charging voltage that often runs up to 20V, some peripheral devices may be configured to operate in a low power mode (such as a dead battery mode), which requires the charging voltage to be regulated before it can be provided to the peripheral device.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

A voltage regulator converts an input voltage into an output voltage and may be used to provide a stable operating voltage to components of an integrated circuit (IC). For example, some ICs use a low drop-out (LDO) regulator to convert a 3.3 V voltage rail into a 1.8V voltage rail for digital logic cells. The drop-out voltage is the minimum difference between the input voltage and the output voltage for which the regulator can still supply the specified current. Because an LDO regulator is a feedback voltage regulator, the output voltage of the LDO regulator is well-regulated.

The USB (Universal Serial Bus) standard defines a type-C connector that includes a Vbus line for power delivery in source mode (e.g., host device providing power) or sink mode (e.g., peripheral device receiving power). During operation, Vbus may be as high as 20V. Since Vbus may be used as a source in low power modes (e.g., dead battery mode), Vbus needs to be regulated to a lower voltage, such as 3V, before it can be used by low power analog or digital blocks of a peripheral device. Conventionally, the high voltage level of Vbus may be regulated by a voltage regulator implemented by devices capable of withstanding high voltage levels (which are also referred to as high voltage devices). For example, FIG. 1 (Prior Art) shows a voltage regulator 100 implemented with a high voltage device MN1. Voltage regulator 100 is a source follower using a high voltage NMOS (n-type or n-channel metal-oxide-semiconductor) transistor MN1. Such a transistor MN1 is also known as an EDNMOS (or extended drain NMOS) that can tolerate more than a 20V drop between the drain and other device terminals (e.g., gate-to-drain voltage Vgd, drain-to-source voltage Vds, and drain-to-body voltage Vdb).

Figure 1:
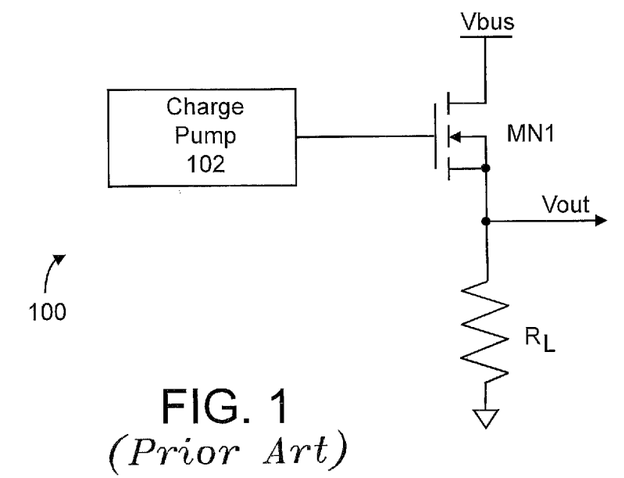
FIG. 1 (Prior Art) illustrates a circuit schematic depicting a conventional voltage regulator implemented with a high voltage device.

As shown, Vbus is connected to MN1's drain electrode, and a load resistor RL is connected between ground and MN1's source electrode, which is also tied to its body electrode (where a body electrode of a transistor is indicated in the drawings as the electrode having the inward pointing arrow, and a source electrode of a transistor is indicated as tied to the body electrode). A gate electrode of MN1 is connected to an output of a charge pump 102. Voltage regulator 100 generates an output voltage Vout (at MN1's source electrode) based on an input voltage Vbus. Vbus may vary in the range of 5V to 20V, depending on the specifications provided by the USB standard. The target voltage level of Vout is generally 3V.

Figure 2:
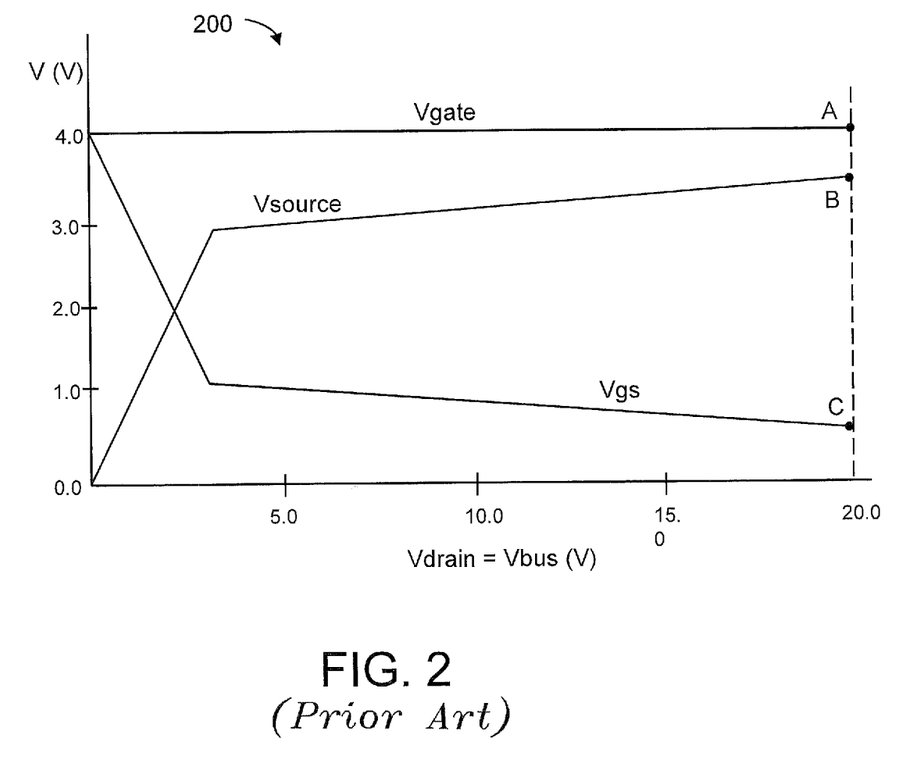
FIG. 2 (Prior Art) illustrates waveforms depicting various node voltages in the conventional voltage regulator implemented with a high voltage device.

FIG. 2 (Prior Art) shows voltage curves for Vgate, Vsource, and Vgs of MN1 as Vdrain (which is connected to Vbus) increases from 0V to 20V. In the example shown, the charge pump 102 applies a gate voltage Vgate of 4V to MN1. The output voltage Vout is equivalent to the source voltage (or Vsource), which has a regulated value around 3V even as Vbus (or Vdrain) changes from 5V to 20V. The difference between the gate and source voltages is shown as Vgs. Even when Vdrain is 20V, Vsource has a value of approximately 3.4V (at point B) and Vgs has a value of approximately 0.6V (at point C), as Vgate also continues to have a value of approximately 4V (at point A).

While high voltage devices are helpful to implement a voltage regulator like that shown in FIG. 1 (Prior Art), some integrated circuits are not compatible with the high voltage technology used to form such high voltage devices. For example, an integrated circuit (IC) may require a memory for some applications to support programmability for different platforms. Such memory may be a form of MTP (multiple time programmable) memory, with limited capability. One approach would be to use high voltage devices on the IC for the voltage regulator and use off-chip flash memory, but such off-chip flash memory is often expensive, making on-chip flash memory preferable. However, flash memory technology may not be compatible with high voltage technology.

The present disclosure provides for a voltage regulator that is implemented with devices capable of withstanding low voltage levels (which need not withstand high voltage levels), also referred to as low voltage devices or low voltage transistors. The low voltage technology used to form such low voltage devices is compatible with flash memory technology used to form on-chip flash memory, and is especially beneficial when high voltage devices are not otherwise available. The voltage regulator includes a network of cascoded low voltage devices, which are controlled by a resistor network in combination with a charge pump, to produce a regulated low voltage output from a high voltage source (e.g., Vbus). In the embodiments discussed herein, the high voltage source is capable of producing a supply voltage in the range of 5V to 20V. In the USB standard, two devices may negotiate which value of the supply voltage is selected, which is then output by the voltage regulator. The low voltage devices are NMOS transistors in the embodiments discussed herein. The low voltage output of the voltage regulator may be used as a supply voltage for internal low voltage circuitries (e.g., analog and digital blocks).

Various embodiments of the voltage regulator are provided for different supply voltage ranges of the high voltage source, such as embodiments for a high voltage source that varies between a low supply voltage of 5V and a high supply voltage 10V, a low supply voltage of 5V and a high supply voltage of 15V, and a low supply voltage of 5V and a high supply voltage of 20V. In the various embodiments, the network of cascoded low voltage NMOS transistors includes a first NMOS transistor whose source electrode provides the regulated low voltage output Vout. A charge pump overdrives the gate of the first NMOS transistor using a bias voltage greater than the device's threshold voltage Vt. As a result, the source voltage of the first NMOS transistor provides the regulated low voltage output Vout at all times, regardless of whether the high voltage source Vbus is producing the low supply voltage value (e.g., 5V) or the high supply voltage value (e.g., 10V, 15V, or 20V).

The values of the resistors in the resistor network are selected to provide a voltage divider that works in combination with output voltages of the charge pump to guarantee that all low voltage transistors in the circuit will never see a voltage difference (across their terminals or electrodes) higher than their breakdown voltage limits within some margin. The values of the resistor network are also selected in such a way that a maximum leakage from the high voltage source Vbus is less than 1 uA (microamp). In some embodiments, multiple low voltage charge pumps may be used, or a low voltage multi-stage charge pump with multiple output voltages may be used. In some embodiments, a simple clamp circuit may be used instead of a charge pump. Using a single charge pump or a clamp circuit also reduces complexity of the voltage regulator circuit. The resistor network is combined with the charge pump(s) in such a way that avoids the need for a high voltage charge pump, which reduces the area needed for the circuit and improves power efficiency (in addition to avoiding the use of high voltage NMOS devices).

As a result, the voltage regulator achieves low leakage, low power consumption, and low area utilization. The voltage regulator is capable of regulating Vbus having values in a range of 5V to 20V, where the range may be extended, if needed. The teachings herein provide that any technology with isolated n-well can be used to implement a voltage regulator circuit using low voltage devices to regulate a high voltage source.

Example Embodiments

A concern for using low voltage devices to regulate a high voltage into a low voltage is the breakdown voltage of the low voltage devices, which is the absolute maximum voltage that a transistor can handle for each of its 3 junctions. For simplicity's sake, the maximum breakdown voltage of a low voltage device is assumed to be approximately 7V (using GO3 device in C14 technology, with additional details shown below in Tables 1-4), which is exceeded by Vbus at 20V. To avoid destroying a low voltage device in a voltage regulator that regulates a low voltage from a high voltage, the voltage regulator circuits discussed herein divide or "break" the high voltage of Vbus into 3 ranges: 5V to 10V, 10V to 15V, and 15V to 20V. The low voltage devices are also cascoded with proper gate bias voltages in order to provide a regulated 3V output. The voltage regulator circuits discussed herein do not require a specific type or generation of low voltage technology. In most embodiments, the voltage regulator circuits are built with transistors having a breakdown voltage less than an input voltage (e.g., Vbus at 5V, 10V, 15V, or 20V). Each voltage regulator circuits provided herein may be configured to work with different levels of Vbus within its designated range. It is also noted that the values of voltages and resistances given herein are examples, and should not be taken to be limiting. Other implementations may use different voltages and resistances.

There are various generations of low voltage technologies, referred to herein as GO1, GO2, and GO3, that can be used to fabricate transistors capable of withstanding different ranges of absolute maximum voltages. For example, Table 1 provides some example voltages that a GO2 NMOS device may withstand, Table 2 provides some example voltages that a GO2 PMOS device may withstand, and Table 3 provides some example voltages that a GO3 may withstand. By contrast, Table 4 provides some example voltages that a high voltage NMOS device may withstand. It is noted that VGS is the gate-source voltage, VGD is the gate-drain voltage, VDS is the drain-source voltage, VBS is the body-source voltage, and VBD is the body-drain voltage.

TABLE 1

| | GO2 NMOS devices | | | | |
| | Absolute | Operating | | | Absolute | |
| Parameter | Minimum | Minimum | Nominal | Maximum | Maximum | Unit |
| --- | --- | --- | --- | --- | --- | --- |
| VGS | −4.6 | −3.6 | 3.3 | 3.6 | 4.6 | V |
| VGD | −4.6 | −3.6 | 3.3 | 3.6 | 4.6 | V |
| VDS | −4.6 | −3.6 | 3.3 | 3.6 | 4.6 | V |
| VBS | | −10 | | 0.5 | | V |
| VBD | | −10 | | 0.5 | | V |

TABLE 2

GO2 PMOS devices

| Parameter | Absolute Minimum | Operating Minimum | Operating Nominal | Operating Maximum | Absolute Maximum | Unit |
|---|---|---|---|---|---|---|
| VGS | −4.6 | −3.6 | −3.3 | 3.6 | 4.6 | V |
| VGD | −4.6 | −3.6 | −3.3 | 3.6 | 4.6 | V |
| VDS | −4.6 | −3.6 | −3.3 | 3.6 | 4.6 | V |
| VBS |  | −0.5 |  | 10 |  | V |
| VBD |  | −0.5 |  | 10 |  | V |

TABLE 3

GO3 NMOS devices

| Parameter | Absolute Minimum | Operating Minimum | Operating Nominal | Operating Maximum | Absolute Maximum | Unit |
|---|---|---|---|---|---|---|
| VGS | −7 | −5.5 | 5 | 5.5 | 7 | V |
| VGD | −7 | −5.5 | 5 | 5.5 | 7 | V |
| VDS (For VGS > 0) | −6 | −5.5 | 5 | 5.5 | 6 | V |
| VDS (For VGS ≤ 0) | −8 | −5.5 | 5 | 5.5 | 8 | V |
| VBS |  | −10 |  | 0.5 |  | V |
| VBD |  | −10 |  | 0.5 |  | V |

TABLE 4

High voltage NMOS devices

| Parameter | Absolute Minimum | Absolute Maximum | Unit |
|---|---|---|---|
| VGS | −20 | 20 | V |
| VGD | −20 | 20 | V |
| VDS | −20 | 20 | V |

Figure 3:
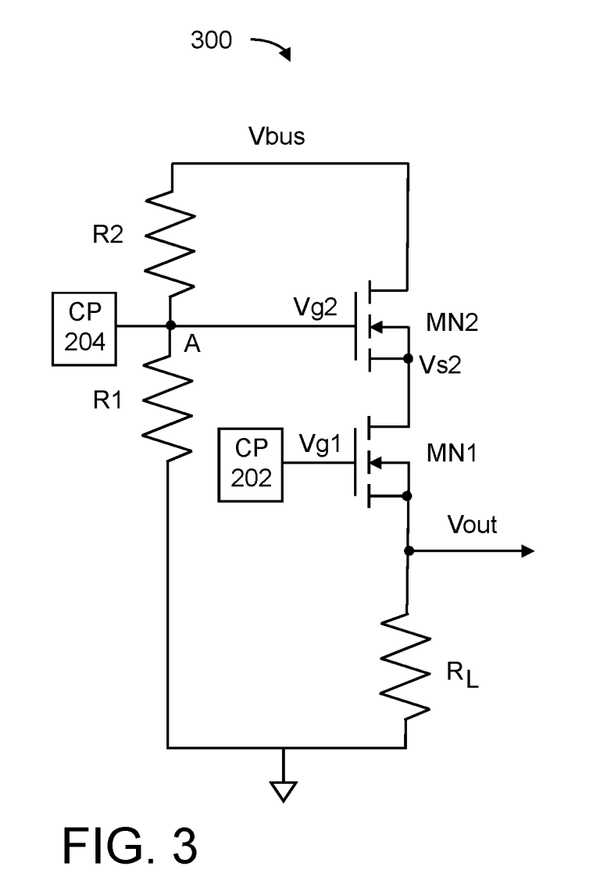
FIGS. 3, 4, and 5 illustrate circuit schematics depicting example voltage regulator circuits implemented with low voltage devices, according to some embodiments of the present disclosure.

FIG. 3 shows an example voltage regulator circuit 300 that implements two low voltage devices MN1 and MN2, which are NMOS (n-type or n-channel metal-oxide-semiconductor) transistors formed with low voltage technology. In the embodiments discussed herein, the low voltage devices (such as MN1, MN2, MN3 and so on) nominally operate at 5V, have a breakdown voltage of 7V, and a threshold voltage Vt of 1V (such as GO3 devices), although other low voltage devices used to implement the voltage regulator circuits herein may have different operating, breakdown, and threshold voltages in other embodiments. The low voltage transistors discussed herein may be implemented using metal-oxide-semiconductor field effect transistor (MOSFET) technology. It will be appreciated that although MOSFET technology is commonly referred to as metal-oxide-semiconductor technology, the gates of such transistors are often made from a non-metallic conductive material, such as polysilicon, and their channels may be insulated by an insulator other than simple oxide.

In FIG. 3, MN1 and MN2 are cascoded, where the source electrode of MN2 is connected to the drain electrode of MN1. In all embodiments discussed herein, the body electrode of an NMOS transistor like MN1 and MN2 (which is identified by an inward pointing arrow) is tied to the source electrode. Load resistor RL models the loading circuitry, which cannot be infinity. As shown, load resistor RL is connected between the source electrode of MN1 and a negative power supply voltage, such as ground. The source electrode of MN1 also serves as the output node that provides output voltage Vout. The drain electrode of MN2 is connected to positive power supply voltage Vbus, which is also the input voltage for voltage regulator circuit 300. A first resistor R1 has a first terminal connected to the gate electrode of MN2 and a second electrode connected to ground. A second resistor R2 has a first terminal connected to the gate electrode of MN2 and a second electrode connected to Vbus. The values of R1 and R2 are further discussed below. The gate electrode of MN1 is connected to a first charge pump output 202 that provides a gate voltage Vg1 to MN1. The gate electrode of MN2 (which is connected to a middle node A between R1 and R2) is connected to a second charge pump output 204 that provides a gate voltage Vg2 to MN2. The bias voltages Vg1 and Vg2 provided to the gate electrodes of the low voltage devices may be provided by two different charge pumps or both may be provided by a single multi-stage charge pump.

To avoid breakdown, a minimum current needs to pass through the devices MN1 and MN2, such as 0.1 uA (microamp). Further, a maximum current of approximately 10 mA (milliamp) should be delivered at the output. Accordingly, a load current IL is assumed to be between 0.1 uA and 10 mA, which implies that:

$$\frac{Vout}{Iout(\min)} < RL < \frac{Vout}{Iout(\max)} \text{ or }$$

$$\frac{3\,V}{0.1\,uA} < RL < \frac{3\,V}{10\,mA}$$

which results in a load resistance RL between 300 Ω (ohms) and 30 MΩ. The values above may be scaled up or down depending on whether higher or lower current is needed, and the size of the low voltage devices may also be scaled up or down for different current levels, as needed. In the embodiment discussed herein, MN1 and MN2 are sized to have an acceptable Rds(on) (or the total resistance of the transistor between the drain and source when the transistor is "on") to achieve 10 mA at the load.

The low voltage devices are in saturation mode when the gate-source voltage Vgs is greater than the threshold voltage Vt (or Vgs>Vt) and when the drain-source voltage Vds is greater than or equal to the gate-source voltage Vgs minus the threshold voltage Vt (or Vds≥Vgs−Vt), where the threshold voltage is approximate 1V for the low voltage devices. The low voltage devices are in triode (or linear) mode when the gate-source voltage Vgs is greater than the threshold voltage Vt (or Vgs>Vt) and when the drain-source voltage Vds is less than the gate-source voltage Vgs minus the threshold voltage (or Vds<Vgs−Vt). In both cases, the low voltage device is on and conducting current between the drain and the source. In triode mode, the low voltage device operates like a resistor, controlled by the gate voltage relative to the source and drain. In saturation mode, the source voltage of each low voltage device is equal to the gate voltage minus the threshold voltage, or Vs=Vg−Vt.

Voltage regulator circuit 300 is provided for a designated range of Vbus between 5V and 10V. When Vbus is 5V, Vg1 is driven to 4V and Vg2 is driven to 6V, which is greater than Vt and turns both devices on. If MN2 were in saturation, MN2's source voltage Vs2 would be equal to 6V−1V, or 5V. However, MN2's drain is tied to 5V, meaning that MN2's source will be less than 5V due to some internal voltage drop across MN2's drain and source. The internal voltage drop across MN2 depends on the Rds(on) of MN2, which is on the order of tens to hundreds of mV (e.g., 50 mV in some embodiments, or 300 mV in other embodiments). In this example, MN2's source voltage Vs2 is less than 5V, but greater than 4V, based on the size of the internal voltage drop. This results in MN2's drain-source voltage Vds2 being less than 1V (e.g., 0.05V), while MN2's gate-source voltage Vgs2 is equal to 2V, which places MN2 in triode mode because Vds2<Vgs2−Vt. Since MN1's drain is tied to MN2's source, MN1's drain voltage Vd1 is equal to MN2's source voltage Vs2 (again, which is less than 5V but greater than 4V). This makes MN1's drain-source voltage Vds1 at least 1V (e.g., 1.95V), while MN1's gate-source voltage Vgs1 is equal to 1V, which places MN1 in saturation mode because Vds1≥Vgs1−Vt. As such, MN1's source voltage Vs1 is equal to 4V−1V, or 3V, which is the desired output voltage for Vout.

When Vbus is 10V, Vg1 and Vg2 are similarly driven to 4V and 6V, respectively, which turns both devices "on" and places them in saturation mode. In saturation, MN1's source voltage Vs1 is equal to 4V−1V, or 3V, which is the desired output voltage for Vout. A similar determination is made for MN2, where MN2's source voltage Vs2 is equal to 6V−1V, or 5V. Since MN2's drain is now tied to 10V, MN2's drain-source voltage Vds2 is equal to 5V and MN2's gate-source voltage Vgs2 is equal to 1V, which places MN2 in saturation mode because Vds2≥Vgs2−Vt. Since MN1's drain is tied to MN2's source, MN1's drain voltage Vd1 is equal to MN2's source voltage Vs2, which is equal to 5V. This makes MN1's drain-source voltage Vds1 equal to 2V, while MN1's gate-source voltage Vgs1 is equal to 1V, which places MN1 in saturation mode because Vds1≥Vgs1−Vt. Example voltages at various nodes in voltage regulator 300 are summarized in Table 5 below, which may have different values in different embodiments (e.g., different values of Vds based on Rds(on) when in triode mode at low values of Vbus).

TABLE 5

Node Voltages for Voltage Regulator 300

| | Vbus = 5 V | | | Vbus = 10 V | | |
|---|---|---|---|---|---|---|
| | Vg | Vs | Vds | Vg | Vs | Vds |
| MN2 | 6 V | 4.95 V | 0.05 V | 6 V | 5 V | 5 V |
| MN1 | 4 V | 3 V (Vout) | 1.95 V | 4 V | 3 V (Vout) | 2 V |

Resistors R1 and R2 form a resistor network, where the values of the resistors in the resistor network are chosen in such a way that none of the low voltage devices get stressed when Vbus changes values, such as from 5V to 10V, and the leakage current from Vbus is less than 0.1 uA (further discussed below in connection with FIG. 5). The resistor network ensures that all voltage drops across the low voltage devices (e.g., voltage drops across any combination of drain, source, gate, and body electrodes) remain below the absolute maximum range for the low voltage devices (such as those provided in Tables 1, 2, and 3).

Figure 4:
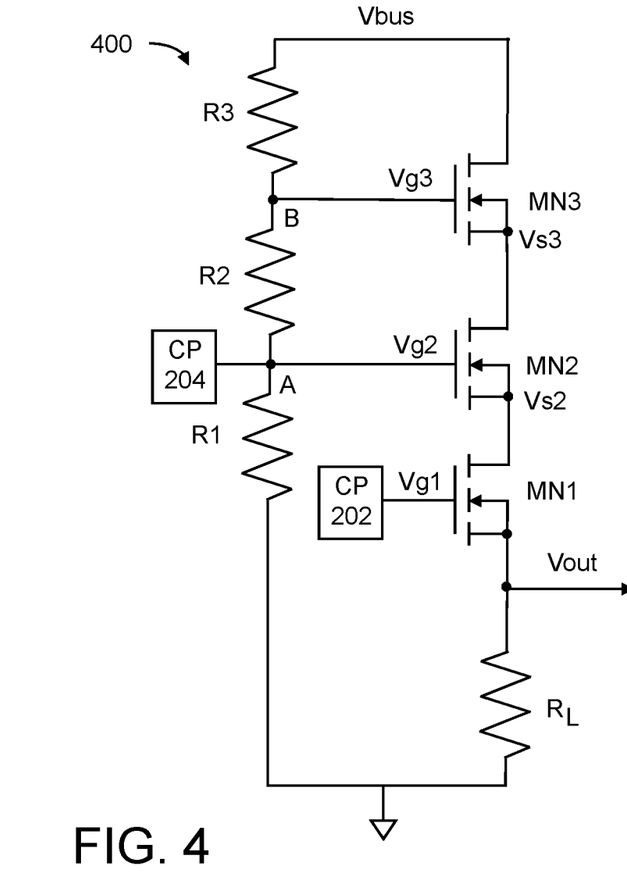

FIG. 4 shows an example voltage regulator circuit 400 that implements three low voltage devices MN1, MN2, and MN3, which are NMOS transistors formed with low voltage technology. In FIG. 4, MN1, MN2, and MN3 are cascoded, where the source electrode of MN3 is connected to the drain electrode of MN2, and the source electrode of MN2 is connected to the drain electrode of MN1. Load resistor RL is connected between the source electrode of MN1 and ground. The source electrode of MN1 also serves as the output node that provides output voltage Vout. The drain electrode of MN3 is connected to Vbus.

A resistor network is formed from resistors R1, R2, and R3 connected in series, with R1 further connected to ground and R3 further connected to Vbus. Node B between R3 and R2 is connected to the gate electrode of MN3, and node A between R2 and R1 is connected to the gate electrode of MN2. The gate electrode of MN1 is connected to a first charge pump output 202 that provides a gate voltage Vg1 to MN1. The gate electrode of MN2 (which is connected to node A between R1 and R2) is connected to a second charge pump output 204 that provides a gate voltage Vg2 to MN2. The gate electrode of MN3 is connected to node B between R3 and R2. The values of resistors in the resistor network are selected to implement a voltage divider that provides a bias voltage Vg3 at node B to MN3, which is some portion of Vbus. The values of the resistors are also chosen to prevent the low voltage devices from getting stressed, as well as to keep leakage current from Vbus below 0.1 uA.

Voltage regulator circuit 400 is provided for a designated range of Vbus between 5V and 15V. When Vbus is 5V, Vg1 is driven to 4V and Vg2 is driven to 6V. The resistor network drives Vg3 to 5.6V when Vbus is 5V. As a result, MN1 is placed in saturation mode (or Vds≥Vgs−Vt), where MN1's source voltage Vs1 is equal to 4V−1V, or 3V, which is the desired output voltage for Vout. Also, MN2 and MN3 are placed in triode mode (or Vds<Vgs−Vt), where MN3's source voltage Vs3 is equal to 5V reduced by some internal voltage drop of MN3, and where MN2's source voltage Vs2 is equal to 5V reduced by the internal voltage drops of MN3 and MN2. In both cases, Vs3 and Vs2 are greater than 4V (e.g., 4.95V and 4.9V, respectively).

When Vbus is 15V, Vg1 and Vg2 are driven to 4V and 6V, respectively, and the resistor network drives Vg3 to 11V. As a result, MN1, MN2, and MN3 are placed in saturation mode (or Vds≥Vgs−Vt). In saturation (Vs=Vg−Vt), MN3's source voltage Vs3 is equal to 10V, MN2's source voltage Vs2 is equal to 5V, and MN1's source voltage Vs1 (or Vout) is equal to 3V. Example voltages at various nodes in voltage regulator 400 are summarized in Table 6 below, which may have different values in different embodiments.

TABLE 6

Node Voltages for Voltage Regulator 400

| | Vbus = 5 V | | | Vbus = 15 V | | |
|---|---|---|---|---|---|---|
| | Vg | Vs | Vds | Vg | Vs | Vds |
| MN3 | 5.6 V | 4.95 V | 0.05 V | 11 V | 10 V | 5 V |
| MN2 | 6 V | 4.9 V | 0.05 V | 6 V | 5 V | 5 V |
| MN1 | 4 V | 3 V (Vout) | 1.9 V | 4 V | 3 V (Vout) | 2 V |

Figure 5:
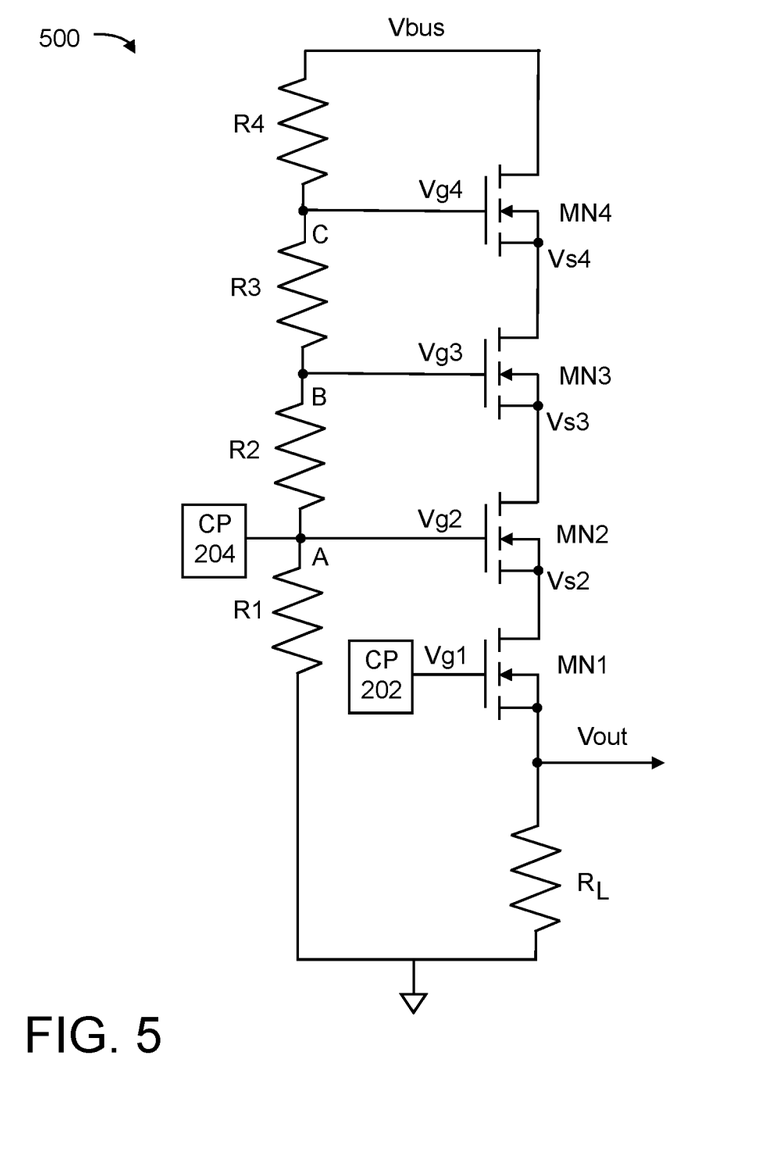

FIG. 5 shows an example voltage regulator circuit 500 that implements four low voltage devices MN1, MN2, MN3, and MN4, which are NMOS transistors formed with low voltage technology. In FIG. 5, the source electrode of MN4 is connected to the drain electrode of MN3, the source electrode of MN3 is connected to the drain electrode of MN2, and the source electrode of MN2 is connected to the drain electrode of MN1. Load resistor RL is connected between the source electrode of MN1 and ground. The source electrode of MN1 also provides output voltage Vout. The drain electrode of MN4 is connected to Vbus.

A resistor network is formed from resistors R1, R2, R3, and R4 connected in series, with R1 further connected to ground and R4 further connected to Vbus. Node A between R1 and R2 is connected to the gate electrode of MN2, node B between R2 and R3 is connected to the gate electrode of MN3, and node C between R3 and R4 is connected to the gate electrode of MN4. The gate electrode of MN1 is connected to a first charge pump output 202 that provides gate voltage Vg1. The gate electrode of MN2 (which is connected to node A) is further connected to a second charge pump output 204 that provides gate voltage Vg2. The values of resistors in the resistor network are selected to implement a voltage divider that provides bias voltage Vg3 at node B to MN3, and bias voltage Vg4 at node C to MN4, both of which are some portion of Vbus. The values of the resistors are also chosen to prevent the low voltage devices from getting stressed, as well as to keep leakage current from Vbus below 0.1 uA.

Voltage regulator circuit 500 is provided for a designated range of Vbus between 5V and 20V. When Vbus is 5V, Vg1 is driven to 4V, Vg2 is driven to 6V, Vg3 is driven to 5.6V, and Vg4 is driven to 5.25V. As a result, MN1 and MN4 are placed in saturation mode, while MN2 and MN3 are placed in triode mode. MN1's source voltage Vs1 becomes 3V, MN2's source voltage Vs2 becomes 4.25V, MN3's source voltage Vs3 becomes 4.3V, and MN4's source voltage Vs4 becomes 4.35V.

When Vbus is 20V, Vg1 is driven to 4V, Vg2 is driven to 6V, Vg3 is driven to 11V, and Vg4 is driven to 16V. As a result, MN1, MN2, MN3, and MN4 are in saturation, with source voltages respectively equal to 3V, 5V, 10V, and 15V. Example voltages at various nodes in voltage regulator 500 are summarized in Table 7 below, which may have different values in different embodiments.

TABLE 7

Node Voltages for Voltage Regulator 500

|     | Vbus = 5 V | | | Vbus = 20 V | | |
| --- | --- | --- | --- | --- | --- | --- |
|     | Vg | Vs | Vds | Vg | Vs | Vds |
| MN4 | 5.25 V | 4.35 V | 0.65 V | 16 V | 15 V | 5 V |
| MN3 | 5.6 V | 4.3 V | 0.05 V | 11 V | 10 V | 5 V |
| MN2 | 6 V | 4.25 V | 0.05 V | 6 V | 5 V | 5 V |
| MN1 | 4 V | 3 V (Vout) | 1.25 V | 4 V | 3 V (Vout) | 2 V |

It is also noted that maximum current leakage takes place in circuit 500 when Vbus is 20V. Using example resistor values of R1=12 MΩ, R2=10 MΩ, R3=10 MΩ, and R4=8 MΩ, the value of the maximum leakage is approximately 20V/(12+10+10+8) MΩ=0.5 uA. In this manner, the leakage from Vbus is kept low.

The teachings herein of the stacked or cascoded transistors that are properly biased using a resistor network and a single multi-stage charge pump to regulate a low voltage output from a high voltage source may be implemented for additional embodiments. For example, other embodiments may stack additional transistors between the high voltage source and the low voltage output and may stack additional resistors in the resistor network to generate proper bias voltages for the stacked transistors, in order to regulate high voltage sources with even larger supply voltages (e.g., greater than 20V).

Figure 6:
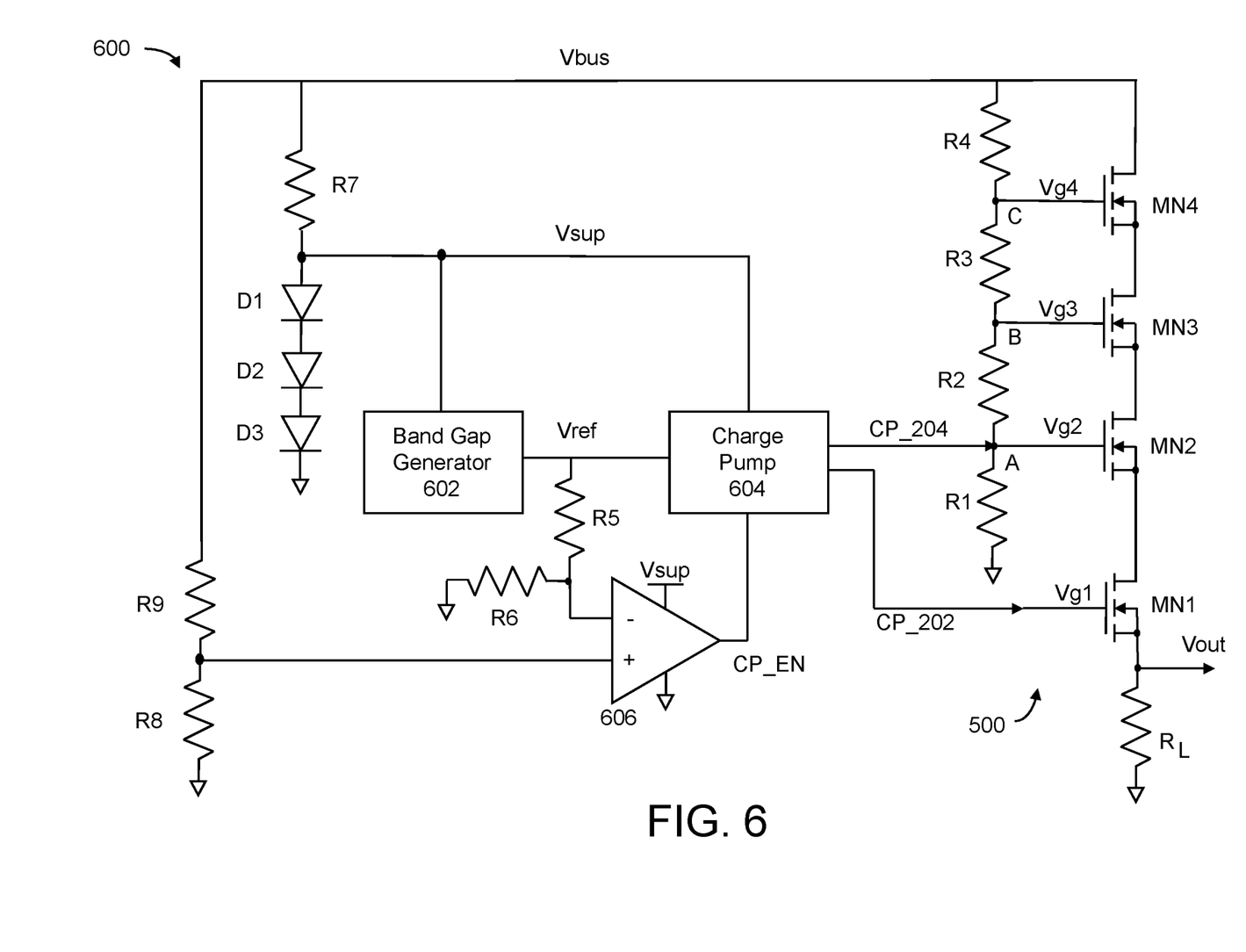
FIG. 6 illustrates a circuit schematic depicting an example voltage regulator circuit implemented with low voltage devices that also includes biasing circuitry, according to some embodiments of the present disclosure.

FIG. 6 illustrates a circuit schematic depicting an example voltage regulator circuit 600 implemented with low voltage devices that also includes biasing circuitry. As shown on the right side of FIG. 6, voltage regulator circuit 600 includes circuit 500 shown in FIG. 5. In the embodiment shown, charge pump voltages CP_202 and CP_204 are provided by a single multi-stage low voltage charge pump 604. In other embodiments, two low voltage charge pumps may be used to respectively output voltages CP_202 and CP_204. In still other embodiments, a clamp circuit may be used to provide voltages CP_202 and CP_204.

Charge pump 604 receives a reference voltage Vref from band gap generator 602, which is configured to output a temperature independent reference voltage Vref at a fixed voltage level, regardless of power supply variations and temperature variations. For example, Vref may be 1.25V, which is close to the theoretical 1.22 eV bandgap of silicon at 0K.

Both bandgap generator 602 and charge pump 604 receive a supply voltage Vsup generated from Vbus using a clamp circuit that includes resistor R7 and diodes D1, D2, and D3. The clamp circuit limits Vsup to a particular voltage range defined by selected values of R7 and D1, D2, and D3.

Voltage regulator 600 also includes a comparator 606, which may be implemented with an operational amplifier or other suitable circuitry. A first voltage divider is formed by resistors R5 and R6 to provide a first input voltage at the inverting (−) input of comparator 606. A second voltage divider is formed by resistors R9 and R8 to provide a second input voltage at the non-inverting (+) input of comparator 606. The values of R5 and R6 are selected to scale down Vref at 1.25V down to approximately 1V, where the relationship between R5 and R6 can be described as R5=R6/4. The values of R9 and R8 are selected to scale Vbus at 5V down to approximately 1V, where the relationship between R9 and R8 can also be described as R8=R9/4. This relationship also scales Vbus at 20V down to 4V, which is within the safe operating range of comparator 606.

When Vbus is less than the low supply voltage at 5V, the voltage at the non-inverting (+) input of comparator 606 is less than 1V, which the comparator 606 compares with the 1V reference voltage at the inverting (−) input and outputs a logic low signal (e.g., CP_EN=0) because the non-inverting (+) input is not greater than the inverting (−) input. When Vbus is equal to or greater than the low supply voltage at 5V (e.g., such as when Vbus is equal to a high voltage supply at 10V, 15V, or 20V), the voltage at the non-inverting (+) input is greater than 1V (e.g., 4V for high voltage supply of 20V). The comparator 606 outputs a logic high signal (e.g., CP_EN=1) because the non-inverting (+) input is greater than the inverting (−) input. The logic high enable signal CP_EN turns on the charge pump 604, which provides a bias voltage CP_202 (e.g., 4V) at the gate electrode of MN1 and a bias voltage CP_204 (e.g., 6V) at the gate electrode of MN2.

In other embodiments, the charge pump 604 may be replaced using a closed loop to generate bias voltages at 6V and 4V, which may provide less variation than a charge pump. In other embodiments, the charge pump 604 may be replaced by a simple clamp circuit like that provided by R7 and D1, D2, and D3. Assuming that the threshold voltage Vt of the diodes is 0.7V, a series of 6 diodes would be needed to achieve a bias voltage Vg1 in the range of 3.5 to 5V (such as 4V). However, the clamp circuit may provide more voltage variation than a charge pump due to diode voltage variation over process, voltage, and temperature (PVT).

Figure 7:
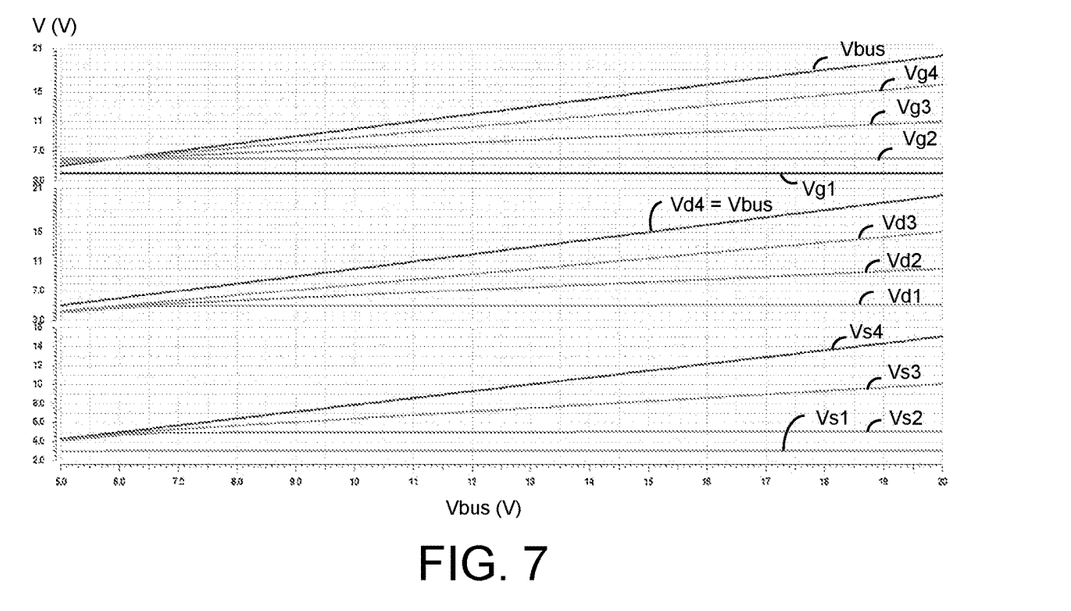
FIGS. 7, 8, 9, and 10 illustrate waveforms depicting various node voltages in the voltage regulator circuit of FIG. 6, according to some embodiments of the present disclosure.
Figure 8:
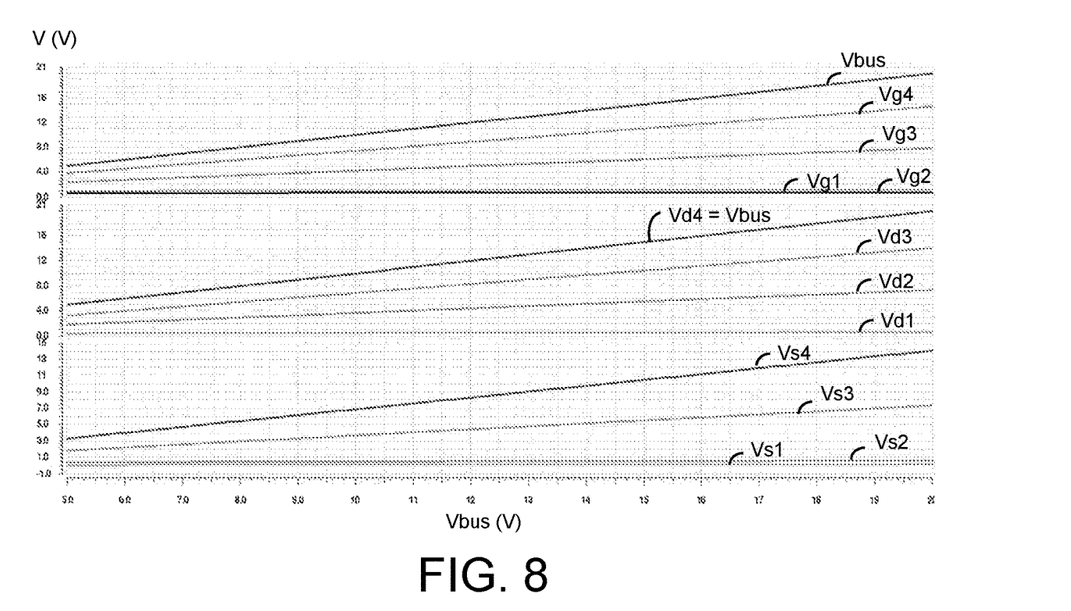
Figure 9:
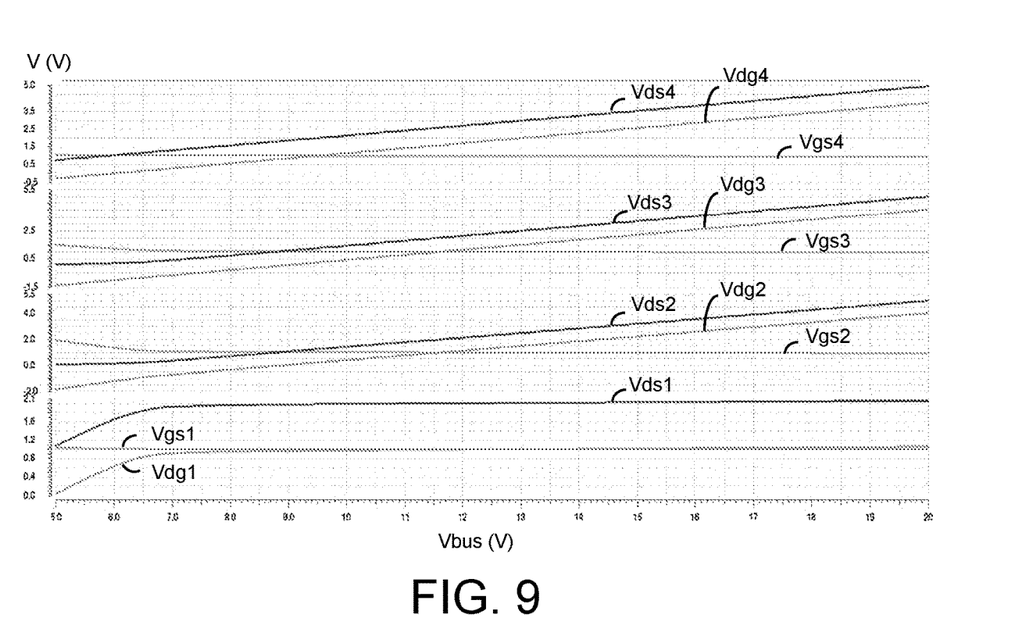
Figure 10:
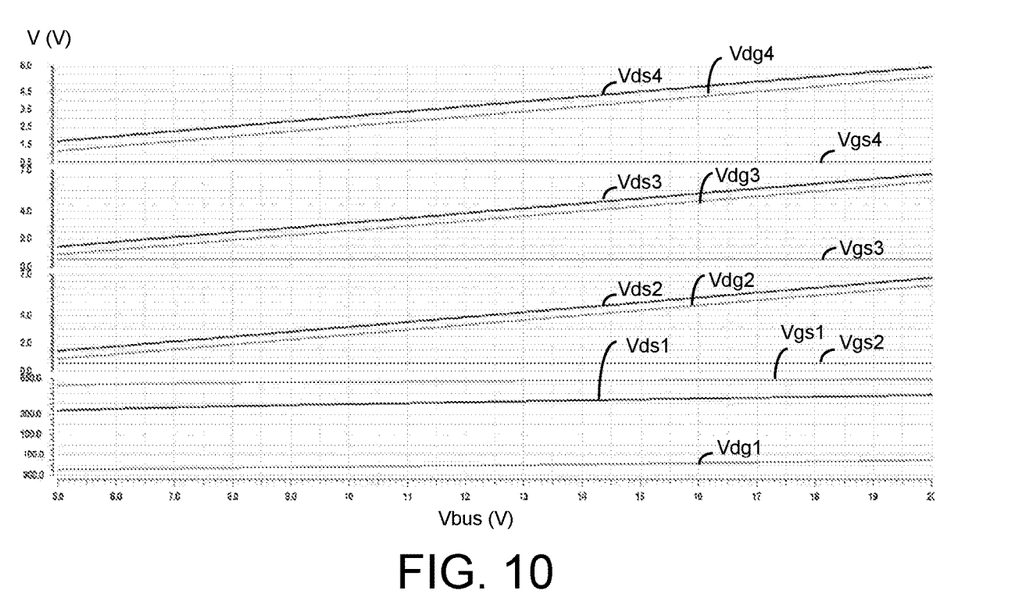

FIGS. 7, 8, 9, and 10 illustrate waveforms depicting various node voltages in low voltage devices implemented in a voltage regulator circuit like that shown in FIG. 5 or FIG. 6, which includes 4 cascoded transistors MN1, MN2, MN3, and MN4. FIG. 7 and FIG. 8 show waveforms of gate (Vg1, Vg2, Vg3, and Vg4), drain (Vd1, Vd2, Vd3, and Vd4), and source (Vs1, Vs2, Vs3, and Vs4) voltages of the low voltage devices, where FIG. 7 shows the waveforms when the charge pump is on and FIG. 8 shows the waveforms when the charge pump is off. FIG. 9 and FIG. 10 show waveforms of drain-source (Vds1, Vds2, Vds3, and Vds4), drain-gate (Vdg1, Vdg2, Vdg3, and Vdg4), and gate-source (Vgs1, Vgs2, Vgs3, and Vgs4) voltages of the low voltage devices. Similarly, FIG. 9 shows the waveforms when the charge pump is on and FIG. 10 shows the waveforms when the charge pump is off. In FIGS. 7, 8, 9, and 10, Vbus is swept from 5V to 20V. While the normal operating condition for the voltage regulator circuits discussed herein is that the charge pump is on when Vbus is greater than 5V, the condition when the charge pump is off is provided to show that the low voltage devices in the voltage regulator circuits discussed herein remain within safe operating ranges (e.g., the low voltage devices do not exceed their maximum breakdown voltages).

In FIG. 7, Vg1 and Vg2 remain at their constant bias voltages of 4V and 6V, respectively (since the charge pump is on), while Vg3 and Vg4 increase proportionally as Vbus increases due to the resistor network providing bias voltages Vg3 and Vg4 based on Vbus. MN1 is biased to operate in saturation for any value of Vbus, resulting in Vs1 (which is the regulated output voltage Vout) and Vd1 remaining at near-constant voltages (as well as Vs2 remaining at near-constant voltage since it is tied to Vd1). As Vbus increases, the remaining drain and source voltages of MN2, MN3, and MN4 increase, as controlled by their respective gate voltages that are also increasing.

In FIG. 8, Vg1 and Vg2 remain near 0V (since the charge pump is off) and MN1 and MN2 are turned off, while Vg3 and Vg4 increase proportionally as Vbus increases due to the resistor network providing bias voltages to MN3 and MN4 based on Vbus. With MN1 and MN2 turned off, Vs1 and Vd1 remain at 0V (as well as Vs2, which is tied to Vd1). As Vbus increases, the remaining drain and source voltages of MN2, MN3, and MN4 increase, as controlled by their respective gate voltages that are also increasing.

In both FIGS. 9 and 10, for all of the low voltage devices, Vdg generally follows Vds, while Vgs remains at a near-constant voltage. In FIG. 9, the maximum Vds reached is approximately 5V, the maximum Vdg is approximately 4V, and the maximum Vgs reached is approximately 2.0V when the charge pump is on. In FIG. 10, the maximum Vds reached is approximately 6.5V, the maximum Vdg is approximately 6.0V, and the maximum Vgs reached is approximately 0.5V when the charge pump is off. All values fall below the maximum breakdown voltage of 7V.

Figure 11:
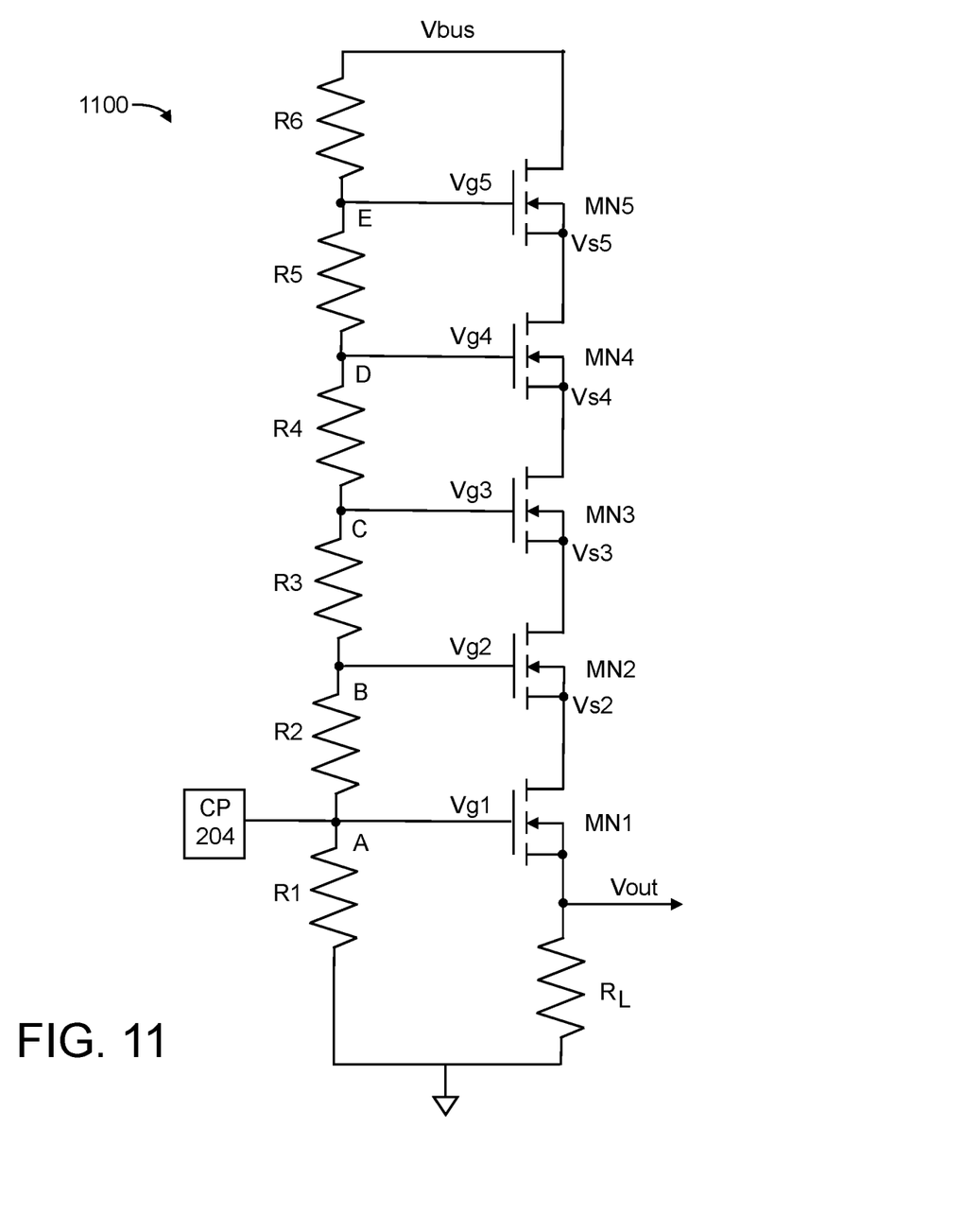
FIG. 11 illustrates a circuit schematic depicting another example voltage regulator circuit implemented with low voltage devices, according to some embodiments of the present disclosure.

FIG. 11 shows another example voltage regulator circuit 1100 implemented with low voltage devices. In the embodiment shown, the low voltage devices are GO2 devices that have a smaller breakdown voltage than the devices used in the voltage regulators described above, such as 4.6V. The threshold voltage Vt is assumed to be approximately 1V, although other low voltage devices used to implement the voltage regulator circuit 110 may have different breakdown and threshold voltages.

Voltage regulator circuit 1100 implements 5 low voltage devices, MN1, MN2, MN3, MN4, and MN5, which are NMOS transistors. The source electrode of MN5 is connected to the drain electrode of MN4, the source electrode of MN4 is connected to the drain electrode of MN3, the source electrode of MN3 is connected to the drain electrode of MN2, and the source electrode of MN2 is connected to the drain electrode of MN1. Load resistor RL is connected between the source electrode of MN1 and ground The source electrode of MN1 also provides output voltage Vout. The drain electrode of MN5 is connected to Vbus.

A resistor network is formed from resistors R1, R2, R3, R4, R5, and R6 connected in series, with R1 further connected to ground and R6 further connected to Vbus. Node A between R1 and R2 is connected to the gate electrode of MN1, node B between R2 and R3 is connected to the gate electrode of MN2, node C between R3 and R4 is connected to the gate electrode of MN3, node D between R4 and R5 is connected to the gate electrode of MN4, node E between R5 and R6 is connected to the gate electrode of MN5. The gate electrode of MN1 (which is connected to node A) is further connected to a charge pump output 204 that provides gate voltage Vg1. The values of resistors in the resistor network are selected to implement a voltage divider that provides bias voltages Vg2, Vg3, Vg4, and Vg5 respectively to the gate electrodes of MN2, MN3, MN4, and MN5, all of which are some portion of Vbus. The values of the resistors are also chosen to prevent the low voltage devices from getting stressed, as well as to keep leakage current from Vbus below 0.1 uA.

Voltage regulator circuit 1100 is provided for a designated range of Vbus between 5V and 20V. When Vbus is 5V, Vg1 is driven to 3.7V, Vg2 is driven to 3.947V, Vg3 is driven to 4.21V, Vg4 is driven to 4.482V, and Vg5 is driven to 4.761V. Vs1 becomes 2.991V (as Vout), Vs2 becomes 3.238V, Vs3 becomes 3.47V, Vs4 becomes 3.741V, and Vs5 becomes 4.032V.

When Vbus is 20V, Vg1 is driven to 3.7V, Vg2 is driven to 6.87V, Vg3 is driven to 10.1V, Vg4 is driven to 13.5V, and Vg5 is driven to 17V. Vs1 becomes 3.032V (as Vout), Vs2 becomes 6.134V, Vs3 becomes 9.405V, Vs4 becomes 12.81V, and Vs5 becomes 16.31V. Example voltages at various nodes in voltage regulator 1100 are summarized in Table 8 below, which may have different values in different embodiments.

TABLE 8

Node Voltages for Voltage Regulator 1100

| | Vbus = 5 V | | | Vbus = 20 V | | |
|---|---|---|---|---|---|---|
| | Vg | Vs | Vds | Vg | Vs | Vds |
| MN5 | 4.761 V | 4.032 V | 0.968 V | 17 V | 16.31 V | 3.69 V |
| MN4 | 4.482 V | 3.741 V | 0.291 V | 13.5 V | 12.81 V | 3.5 V |
| MN3 | 4.21 V | 3.47 V | 0.271 V | 10.1 V | 9.405 V | 3.405 V |
| MN2 | 3.947 V | 3.238 V | 0.232 V | 6.8 V | 6.134 V | 3.271 V |
| MN1 | 3.7 V | 2.991 V (Vout) | 0.247 V | 3.7 V | 3.032 V (Vout) | 3.102 V |

Figure 12:
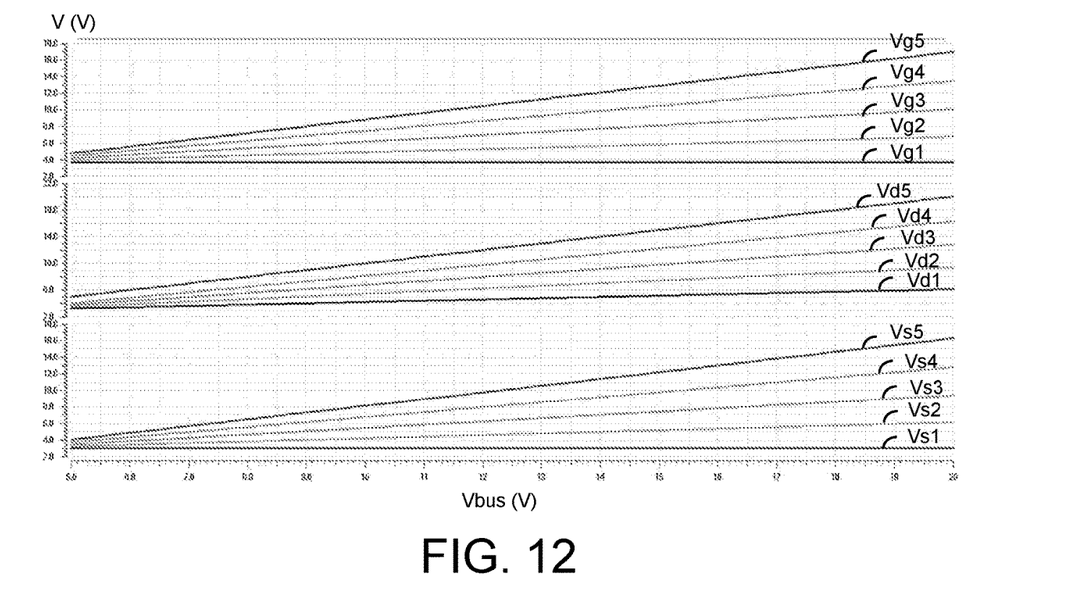
FIGS. 12, 13, 14, and 15 illustrate waveforms depicting various node voltages in the voltage regulator circuit of FIG. 11, according to some embodiments of the present disclosure.
Figure 13:
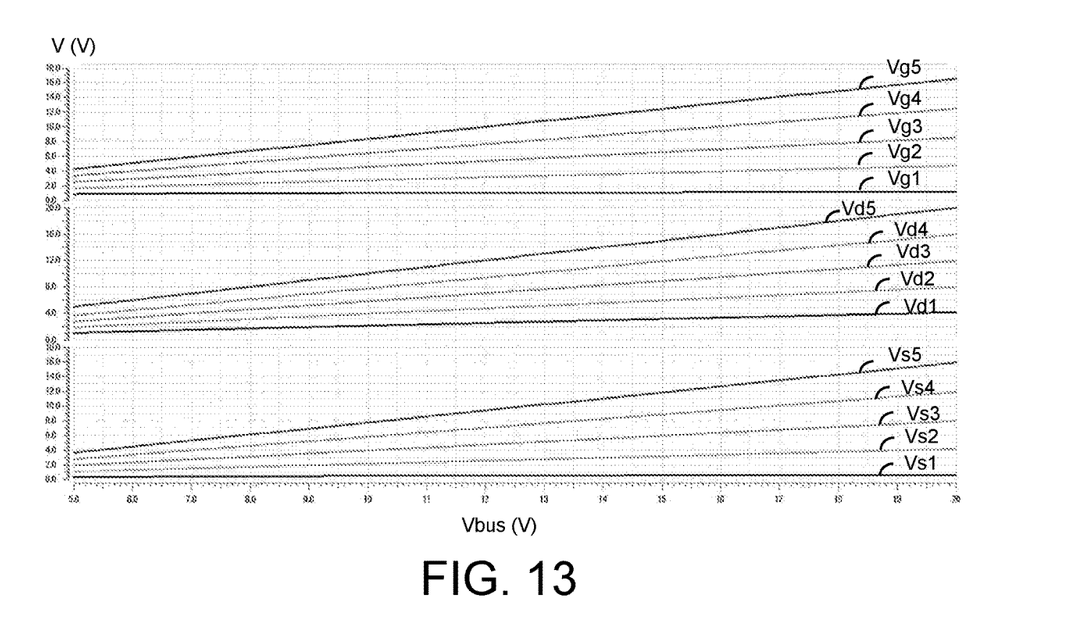
Figure 14:
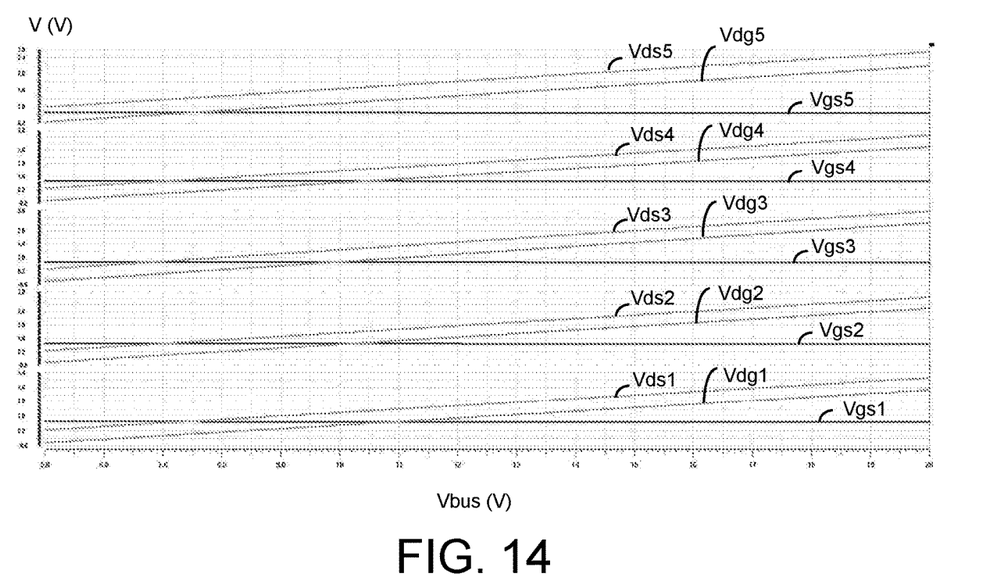
Figure 15:
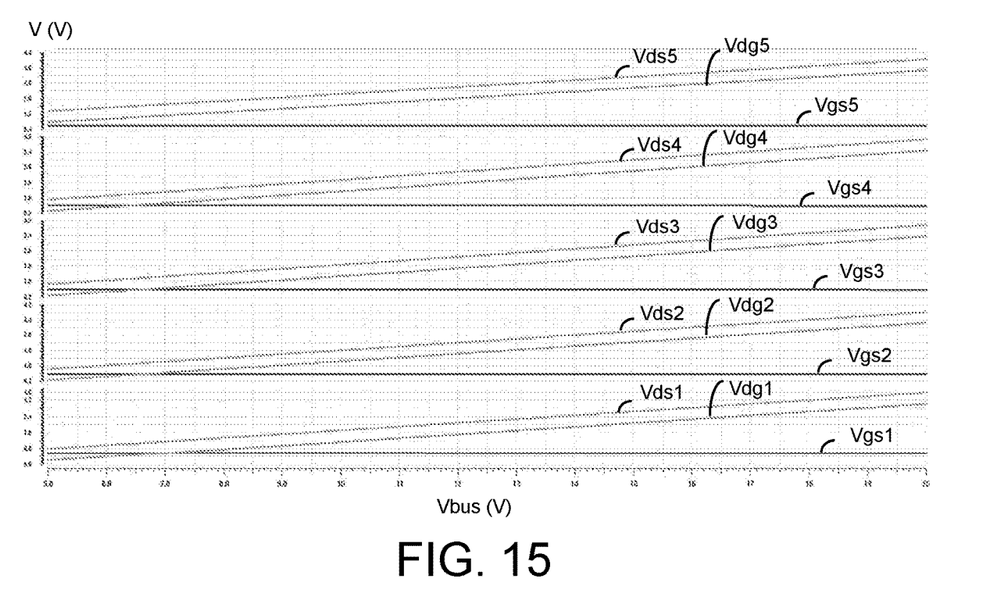

FIGS. 12, 13, 14, and 15 illustrate waveforms depicting various node voltages in low voltage devices implemented in a voltage regulator circuit like that shown in FIG. 11, which includes 5 cascoded transistors MN1, MN2, MN3, MN4, MN5. FIG. 12 and FIG. 13 show waveforms of gate (Vg1, Vg2, Vg3, Vg4, and Vg5), drain (Vd1, Vd2, Vd3, Vd4, and Vd5), and source (Vs1, Vs2, Vs3, Vs4, and Vs5) voltages of the low voltage devices, where FIG. 12 shows the waveforms when the charge pump is on and FIG. 13 shows the waveforms when the charge pump is off. FIG. 14 and FIG. 15 show waveforms of drain-source (Vds1, Vds2, Vds3, Vds4, and Vds5), drain-gate (Vdg1, Vdg2, Vdg3, Vdg4, and Vdg5), and gate-source (Vgs1, Vgs2, Vgs3, Vgs4, and Vgs5) voltages of the low voltage devices. Similarly, FIG. 14 shows the waveforms when the charge pump is on and FIG. 15 shows the waveforms when the charge pump is off. In FIGS. 12, 13, 14, and 15, Vbus is swept from 5V to 20V. While the normal operating condition for the voltage regulator circuits discussed herein is that the charge pump is on when Vbus is greater than 5V, the condition when the charge pump is off is provided to show that the low voltage devices in the voltage regulator circuits discussed herein remain within safe operating ranges (e.g., the low voltage devices do not exceed their maximum breakdown voltages).

As shown in FIG. 12, Vg1 remains at a constant bias voltage of 3.7V (since the charge pump is on), while the remaining gate voltages increase proportionally as Vbus increases due to the resistor network providing bias voltage Vg2, Vg3, Vg4, and Vg5 based on Vbus. MN1 is biased to operate in saturation for any value of Vbus, resulting in Vs1 (which is the regulated output voltage Vout) remaining at a near-constant voltage. As Vbus increases, the remaining drain and source voltages of MN1, MN2, MN3, MN4, and MN5 increase, as controlled by their respective gate voltages that are also increasing.

As shown in FIG. 13, Vg1 does not receive the bias voltage of 3.7V (since the charge pump is off). However, since Vg1 is tied into the resistor network, all gate voltages increase proportionally as Vbus increases due to the resistor network providing bias voltages Vg1, Vg2, Vg3, Vg4, and Vg5 based on Vbus. However, based on the implementation of the resistor network, Vg1 may not be great enough to turn on MN1 (e.g., Vg1<1V), meaning Vs1 remains near 0V. As Vbus increases, the remaining drain and source voltages of MN1, MN2, MN3, MN4, and MN5 increase, as controlled by their respective gate voltages that are also increasing.

In both FIGS. 12 and 13, for all of the low voltage devices, Vdg follows Vds at a same rate, while Vgs tends to remain at a constant voltage. When the charge pump is on, the maximum Vds reached is approximately 3.4V, the maximum Vdg is approximately 2.6V, and the maximum Vgs reached is approximately 1.0V. When the charge pump is off, the maximum Vds reached is approximately 4.0V, the maximum Vdg is approximately 3.6V, and the maximum Vgs reached is approximately 0.8V. All values fall below the maximum breakdown voltage of 4.6V.

By now it should be appreciated that there has been provided a voltage regulator that includes a network of cascoded low voltage devices, which are controlled by a resistor network in combination with a charge pump, to produce a regulated low voltage output from a high voltage source (e.g., Vbus), where the high voltage source may provide a supply voltage greater than the maximum breakdown voltage of the low voltage devices.

In one embodiment of the present disclosure, a voltage regulator for regulating a high voltage source down to a low voltage output is provided, the voltage regulator circuit including: a first and a second NMOS (n-channel metal-oxide-semiconductor) transistor, wherein a source electrode of the first NMOS transistor is connected to a load resistance, a drain electrode of the first NMOS transistor is connected to a source electrode of the second NMOS, and a drain electrode of the second NMOS is coupled to the high voltage source, wherein the source electrode of the first NMOS transistor provides the low voltage output; a resistor network including a first and a second resistor, the first resistor having one terminal connected with one terminal of the second resistor, the first resistor having another terminal connected to ground, the second resistor having another terminal coupled to the high voltage source, wherein a gate electrode of the second NMOS is connected to a node between the first and second resistors; and a multi-stage charge pump having a first output connected to the gate electrode of the first NMOS and a second output connected to the gate electrode of the second NMOS, the multi-stage charge pump configured to generate a first bias voltage at the first output and a second bias voltage at the second output.

One aspect of the above embodiment provides that the first and second NMOS transistors each have a maximum breakdown voltage that is less than the high voltage source.

Another aspect of the above embodiment provides that the high voltage source is configured to vary across a range of 5V to 10V.

Another aspect of the above embodiment provides that the first bias voltage is 4V and the second bias voltage is 6V.

Another aspect of the above embodiment provides that the low voltage output is regulated to 3V.

Another aspect of the above embodiment provides that the voltage regulator further includes: a third NMOS transistor, wherein a source electrode of the third NMOS transistor is connected to the drain electrode of the second NMOS, and a drain electrode of the third NMOS is coupled to the high voltage source, wherein the drain electrode of the second NMOS is coupled to the high voltage source through the third NMOS transistor; and a third resistor having one terminal connected in series with the second resistor and another terminal coupled to the high voltage source, wherein a gate electrode of the third NMOS transistor is connected to a node between the second and third resistors, and the second resistor is coupled to the high voltage source through the third resistor.

A further aspect of the above embodiment provides that the high voltage source is configured to vary across a range of 5V to 15V.

Another further aspect of the above embodiment provides that the voltage regulator further includes: a fourth NMOS transistor, wherein a source electrode of the fourth NMOS transistor is connected to the drain electrode of the third NMOS, and a drain electrode of the fourth NMOS is coupled to the high voltage source, wherein the drain electrode of the third NMOS is coupled to the high voltage source through the fourth NMOS transistor; and a fourth resistor having one terminal connected in series with the third resistor and another terminal coupled to the high voltage source, wherein a gate electrode of the fourth NMOS transistor is connected to a node between the third and fourth resistors, and the third resistor is coupled to the high voltage source through the fourth resistor.

A still further aspect of the above embodiment provides that the high voltage source is configured to vary across a range of 5V to 20V.

Another still further aspect of the above embodiment provides that the voltage regulator further includes: a bandgap reference voltage generator configured to generate a reference voltage; and a comparator configured to output an enable signal to the charge pump, wherein the charge pump is configured to output the first and second bias voltages when enabled.

A yet still further aspect of the above embodiment provides that the comparator is configured to compare a first input voltage that is a scaled version of the reference voltage with a second input voltage that is a scaled version of the high voltage source, wherein the comparator is further configured to output a logic high signal to the charge pump when the scaled version of the high voltage source exceeds the scaled version of the reference voltage.

In another embodiment of the present disclosure, a voltage regulator for regulating a high voltage source down to a low voltage output is provided, the voltage regulator circuit including: a first, a second, a third, a fourth, and a fifth NMOS (n-channel metal-oxide-semiconductor) transistor cascoded between the high voltage source and the low voltage output; a resistor network including a first, a second, a third, a fourth, a fifth, and a sixth resistor connected in series between the high voltage source and ground, wherein a gate electrode of the first NMOS is connected to a node between the first and second resistors, a gate electrode of the second NMOS is connected to a node between the second and third resistors, a gate electrode of the third NMOS is connected to a node between the third and fourth resistors, a gate electrode of the fourth NMOS is connected to a node between the fourth and fifth resistors, and a gate electrode of the fifth NMOS is connected to a node between the fifth and sixth resistors; and a multi-stage charge pump having an output connected to the gate electrode of the first NMOS, the multi-stage charge pump configured to generate a first bias voltage at the first output.

One aspect of the above embodiment provides that a source electrode of the first NMOS transistor is coupled to a load resistance, and the source electrode of the first NMOS transistor provides the low voltage output.

Another aspect of the above embodiment provides that a drain electrode of the first NMOS transistor is connected to a source electrode of the second NMOS transistor, a drain electrode of the second NMOS transistor is connected to a source electrode of the third NMOS transistor, a drain electrode of the third NMOS transistor is connected to a source electrode of the fourth NMOS transistor, a drain electrode of the fourth NMOS transistor is connected to a source electrode of the fifth NMOS transistor, and a drain electrode of the fifth NMOS transistor is coupled to the high voltage source.

Another aspect of the above embodiment provides that the first resistor has one terminal connected to ground and another terminal connected to one terminal of the second resistor, the second resistor has another terminal connected to one terminal of the third resistor, the third resistor has another terminal connected to one terminal of the fourth resistor, the fourth resistor has another terminal connected to one terminal of the fifth resistor, the fifth resistor has another terminal connected to one terminal of the sixth resistor, and the sixth resistor has another terminal coupled to the high voltage source.

Another aspect of the above embodiment provides that the first and second NMOS transistors each have a maximum breakdown voltage that is less than the high voltage source.

Another aspect of the above embodiment provides that the high voltage source is configured to vary across a range of 5V to 20V.

Another aspect of the above embodiment provides that the first bias voltage is 3.7V.

Another aspect of the above embodiment provides that the low voltage output is regulated to 3V.

In another embodiment of the present disclosure, a voltage regulator for regulating a high voltage source down to a low voltage output is provided, the voltage regulator circuit including: a first, a second, a third, and a fourth NMOS (n-channel metal-oxide-semiconductor) transistor cascoded between the high voltage source and the low voltage output; a resistor network including a first, a second, a third, and a fourth resistor connected in series between the high voltage source and ground, wherein a gate electrode of the second NMOS is connected to a node between the first and second resistors, a gate electrode of the third NMOS is connected to a node between the second and third resistors, and a gate electrode of the fourth NMOS is connected to a node between the third and fourth resistors; and a multi-stage charge pump having a first output connected to a gate electrode of the first NMOS and a second output connected to the gate electrode of the second NMOS, the multi-stage charge pump configured to generate a first bias voltage at the first output and a second bias voltage at the second output.

The circuitry described herein may be implemented on a semiconductor substrate or wafer, which can be any semiconductor material or combinations of materials, such as gallium arsenide, silicon germanium, silicon-on-insulator (SOI), silicon, monocrystalline silicon, the like, and combinations of the above.

The circuitry may be formed using a sequence of numerous process steps applied to the semiconductor substrate or wafer, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like. Examples of integrated circuit components include but are not limited to a processor, memory, logic, analog circuitry, sensor, MEMS (microelectromechanical systems) device, a standalone discrete device such as a resistor, inductor, capacitor, diode, power transistor, and the like. In some embodiments, the circuitry may be a combination of the integrated circuit components listed above or may be another type of microelectronic device.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. For example, a switch may be "coupled to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected).

Also as used herein, the terms "approximately" and "about" mean a value close to or within an acceptable range of an indicated value, amount, or quality, which also includes the exact indicated value itself.

As used herein, the terms "substantial" and "substantially" mean sufficient to achieve the stated purpose or value in a practical manner, taking into account any minor imperfections or deviations, if any, that arise from usual and expected process abnormalities that may occur during wafer fabrication, which are not significant for the stated purpose or value.

Although the invention is described herein with reference to specific embodiments, various modifications and changes can be made without departing from the scope of the present invention as set forth in the claims below. For example, additional or fewer cascoded transistors may be implemented in FIG. 4. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A voltage regulator for regulating a high voltage source down to a low voltage output, the voltage regulator circuit comprising:
   a first and a second NMOS (n-channel metal-oxide-semiconductor) transistor, wherein a source electrode of the first NMOS transistor is connected to a load resistance, a drain electrode of the first NMOS transistor is connected to a source electrode of the second NMOS, and a drain electrode of the second NMOS is coupled to the high voltage source, wherein the source electrode of the first NMOS transistor provides the low voltage output;
   a resistor network including a first and a second resistor, the first resistor having one terminal connected with one terminal of the second resistor, the first resistor having another terminal connected to ground, the second resistor having another terminal coupled to the high voltage source, wherein a gate electrode of the second NMOS is connected to a node between the first and second resistors; and
   a bias circuit having a first output connected to the gate electrode of the first NMOS and a second output connected to the gate electrode of the second NMOS, the bias circuit configured to generate a first bias voltage at the first output and a second bias voltage at the second output, and the first and second bias voltages configured to remain constant even when the high voltage source varies across a range of voltage levels.

2. The voltage regulator of claim 1, wherein the first and second NMOS transistors each have a maximum breakdown voltage that is less than the high voltage source.

3. The voltage regulator of claim 1, wherein the high voltage source is configured to vary across a range of 5V to 10V.

4. The voltage regulator of claim 1, wherein the first bias voltage is 4V and the second bias voltage is 6V.

5. The voltage regulator of claim 1, wherein the low voltage output is regulated to 3V.

6. The voltage regulator of claim 1, further comprising:
   a third NMOS transistor, wherein a source electrode of the third NMOS transistor is connected to the drain electrode of the second NMOS, and a drain electrode of the third NMOS is coupled to the high voltage source, wherein the drain electrode of the second NMOS is coupled to the high voltage source through the third NMOS transistor; and
   a third resistor having one terminal connected in series with the second resistor and another terminal coupled to the high voltage source, wherein a gate electrode of the third NMOS transistor is connected to a node between the second and third resistors, and the second resistor is coupled to the high voltage source through the third resistor.

7. The voltage regulator of claim 6, wherein the high voltage source is configured to vary across a range of 5V to 15V.

8. The voltage regulator of claim 6, further comprising:
   a fourth NMOS transistor, wherein a source electrode of the fourth NMOS transistor is connected to the drain electrode of the third NMOS, and a drain electrode of the fourth NMOS is coupled to the high voltage source, wherein the drain electrode of the third NMOS is coupled to the high voltage source through the fourth NMOS transistor; and
   a fourth resistor having one terminal connected in series with the third resistor and another terminal coupled to the high voltage source, wherein a gate electrode of the fourth NMOS transistor is connected to a node between the third and fourth resistors, and the third resistor is coupled to the high voltage source through the fourth resistor.

9. The voltage regulator of claim 8, wherein the high voltage source is configured to vary across a range of 5V to 20V.

10. The voltage regulator of claim 8, wherein the bias circuit comprises a charge pump, and further comprising:
    a bandgap reference voltage generator configured to generate a reference voltage; and
    a comparator configured to output an enable signal to the charge pump, wherein the charge pump is configured to output the first and second bias voltages when enabled.

11. The voltage regulator of claim 10, wherein the comparator is configured to compare a first input voltage that is a scaled version of the reference voltage with a second input voltage that is a scaled version of the high voltage source, and wherein the comparator is further configured to output a logic high signal to the charge pump when the scaled version of the high voltage source exceeds the scaled version of the reference voltage.

12. A voltage regulator for regulating a high voltage source down to a low voltage output, the voltage regulator circuit comprising:
a first, a second, a third, a fourth, and a fifth NMOS (n-channel metal-oxide-semiconductor) transistor cascoded between the high voltage source and the low voltage output;
a resistor network including a first, a second, a third, a fourth, a fifth, and a sixth resistor connected in series between the high voltage source and ground, wherein
a gate electrode of the first NMOS is connected to a node between the first and second resistors,
a gate electrode of the second NMOS is connected to a node between the second and third resistors,
a gate electrode of the third NMOS is connected to a node between the third and fourth resistors,
a gate electrode of the fourth NMOS is connected to a node between the fourth and fifth resistors, and
a gate electrode of the fifth NMOS is connected to a node between the fifth and sixth resistors; and
a bias circuit having an output connected to the gate electrode of the fifth NMOS, the bias circuit configured to generate a first bias voltage at the first output, and the first bias voltage configured to remain constant even when the high voltage source varies across a range of voltage levels.

13. The voltage regulator of claim 12, wherein a source electrode of the first NMOS transistor is coupled to a load resistance, and the source electrode of the first NMOS transistor provides the low voltage output.

14. The voltage regulator of claim 12, wherein
a drain electrode of the first NMOS transistor is connected to a source electrode of the second NMOS transistor,
a drain electrode of the second NMOS transistor is connected to a source electrode of the third NMOS transistor,
a drain electrode of the third NMOS transistor is connected to a source electrode of the fourth NMOS transistor,
a drain electrode of the fourth NMOS transistor is connected to a source electrode of the fifth NMOS transistor, and
a drain electrode of the fifth NMOS transistor is coupled to the high voltage source.

15. The voltage regulator of claim 12, wherein
the first resistor has one terminal connected to ground and another terminal connected to one terminal of the second resistor,
the second resistor has another terminal connected to one terminal of the third resistor,
the third resistor has another terminal connected to one terminal of the fourth resistor,
the fourth resistor has another terminal connected to one terminal of the fifth resistor,
the fifth resistor has another terminal connected to one terminal of the sixth resistor, and
the sixth resistor has another terminal coupled to the high voltage source.

16. The voltage regulator of claim 12, wherein the first and second NMOS transistors each have a maximum breakdown voltage that is less than the high voltage source.

17. The voltage regulator of claim 12, wherein the high voltage source is configured to vary across a range of 5V to 20V.

18. The voltage regulator of claim 12, wherein the first bias voltage is 3.7V.

19. The voltage regulator of claim 12, wherein the low voltage output is regulated to 3V.

20. A voltage regulator for regulating a high voltage source down to a low voltage output, the voltage regulator circuit comprising:
a first, a second, a third, and a fourth NMOS (n-channel metal-oxide-semiconductor) transistor cascoded between the high voltage source and the low voltage output;
a resistor network including a first, a second, a third, and a fourth resistor connected in series between the high voltage source and ground, wherein
a gate electrode of the second NMOS is connected to a node between the first and second resistors,
a gate electrode of the third NMOS is connected to a node between the second and third resistors, and
a gate electrode of the fourth NMOS is connected to a node between the third and fourth resistors; and
a bias circuit having a first output connected to a gate electrode of the first NMOS and a second output connected to the gate electrode of the second NMOS, the bias circuit configured to generate a first bias voltage at the first output and a second bias voltage at the second output, and the first and second bias voltages configured to remain constant even when the high voltage source varies across a range of voltage levels.

21. The voltage regulator of claim 1, wherein the bias circuit comprises at least one charge pump or at least one clamp circuit.

22. The voltage regulator of claim 1, wherein the bias circuit comprises a multi-stage charge pump.

23. The voltage regulator of claim 22, further comprising a comparator configured to output an enable signal to the multi-stage charge pump, and wherein the multi-stage charge pump is configured to output the first and second bias voltages when enabled.

24. The voltage regulator of claim 12, wherein the bias circuit comprises at least one charge pump or at least one clamp circuit.

25. The voltage regulator of claim 12, wherein the bias circuit comprises a multi-stage charge pump.

26. The voltage regulator of claim 25, further comprising a comparator configured to output an enable signal to the multi-stage charge pump, and wherein the multi-stage charge pump is configured to output the first bias voltage when enabled.

* * * * *